(12) United States Patent
Wills et al.

(10) Patent No.: US 8,682,720 B1
(45) Date of Patent: Mar. 25, 2014

(54) SELECTION AND DISPLAY OF ONLINE ADVERTISEMENTS

(75) Inventors: Josh T. Wills, San Francisco, CA (US); Derek Leslie-Cook, San Francisco, CA (US); Marc Berndl, San Francisco, CA (US); Gagan Aggarwal, Sunnyvale, CA (US); Dan Liu, Sunnyvale, CA (US); Humphrey H. Nash, Jr., Sunnyvale, CA (US); Diane L. Tang, Palo Alto, CA (US); Jonathan G. Alferness, San Francisco, CA (US); Adam I. Juda, New York, NY (US)

(73) Assignee: Google Inc., Mountain View, CA (US)

(*) Notice: Subject to any disclaimer, the term of this patent is extended or adjusted under 35 U.S.C. 154(b) by 470 days.

(21) Appl. No.: 12/982,144

(22) Filed: Dec. 30, 2010

(51) Int. Cl.
*G06Q 30/00* (2012.01)

(52) U.S. Cl.
USPC ..................................... 705/14.4; 705/14.43

(58) Field of Classification Search
USPC .......................................................... 705/14
See application file for complete search history.

(56) References Cited

U.S. PATENT DOCUMENTS

| | | | |
|---|---|---|---|
| 2005/0080772 A1* | 4/2005 | Bem | 707/3 |
| 2007/0078707 A1* | 4/2007 | Axe et al. | 705/14 |
| 2007/0150348 A1* | 6/2007 | Hussain et al. | 705/14 |
| 2009/0063278 A1* | 3/2009 | Song et al. | 705/14 |
| 2011/0131093 A1* | 6/2011 | Behroozi et al. | 705/14.52 |
| 2011/0313865 A1* | 12/2011 | Sinyagin et al. | 705/14.69 |
| 2012/0166277 A1* | 6/2012 | Gnanamani et al. | 705/14.49 |
| 2012/0253899 A1* | 10/2012 | Qin et al. | 705/14.4 |

* cited by examiner

*Primary Examiner* — Matthew L Hamilton
(74) *Attorney, Agent, or Firm* — Leason Ellis LLP (57) ABSTRACT

This specification describes technologies relating to displaying online content. In general, one aspect of the subject matter described in this specification can be embodied in methods that include receiving a collection of advertisement candidates for display in an online medium, the advertisement candidates each assigned a quality score calculated based at least in part on a measure indicative of relevance of the respective advertisement candidate to online content for concurrent display in the online medium, determining a score threshold based at least in part on relationships among multiple quality scores of the quality scores associated with the advertisement candidates in the collection of advertisement candidates, and based on the determined score threshold, identifying a subset of advertisement candidates of the collection for display. Other embodiments of this aspect include corresponding systems, apparatus, and computer program products.

15 Claims, 7 Drawing Sheets

Fig. 6

SELECTION AND DISPLAY OF ONLINE ADVERTISEMENTS

BACKGROUND

The present disclosure relates to the selection and display of online advertisements.

Online content can include web pages and advertisements displayed with the web pages. A user viewing the web pages and advertisements may be more likely to follow up on the advertisements if the advertisements have relevance to the web page. For example, if the web page relates to a particular topic, the user may be interested in that topic and may also be interested in purchasing advertised products or services related to that topic. Advertisements that are candidates for display with a web page can be evaluated for their relevance to that web page and assigned a score that quantifies this relevance.

SUMMARY

This specification describes technologies relating to selection and display of online advertisements.

In general, one aspect of the subject matter described in this specification can be embodied in a method that includes receiving a collection of advertisement candidates for display in an online medium, the advertisement candidates each assigned a quality score calculated based at least in part on a measure indicative of relevance of the respective advertisement candidate to online content for concurrent display in the online medium, determining a score threshold based at least in part on relationships among multiple quality scores of the quality scores associated with the advertisement candidates in the collection of advertisement candidates, and based on the determined score threshold, identifying a subset of advertisement candidates of the collection for display. Other embodiments of this aspect include corresponding system, apparatus, and computer program products.

These and other embodiments can each optionally include one or more of the following features. Identifying a subset of advertisement candidates of the collection for display includes identifying one advertisement candidate of the collection to exclude from the subset, based on a relationship between a quality score of the one advertisement candidate and quality scores of the other advertisement candidates of the collection. Determining the score threshold includes calculating the score threshold by dividing a predetermined threshold value by a number of advertisement candidates in the subset. Determining the score threshold includes calculating the score threshold based on a characteristic of search results for display in association with the advertisement candidates. Determining the score threshold includes calculating the score threshold based on a characteristic of a user of the online medium.

In general, another aspect of the subject matter described in this specification can be embodied in a method that includes receiving advertisement candidates for display in an online medium, the advertisement candidates each assigned a numerical score, filtering the received advertisement candidates based on a first threshold to determine a subset of the advertisement candidates each having a numerical score greater than the first threshold, evaluating a characteristic of the subset based on a second threshold, and based on the evaluation, removing from the subset the advertisement candidate having a lowest numerical score when the characteristic of the subset does not satisfy the second threshold. Other embodiments of this aspect include corresponding system, apparatus, and computer program products.

These and other embodiments can each optionally include one or more of the following features. The method includes calculating the second threshold by dividing a predetermined threshold value by a number of advertisement candidates in the subset. The characteristic of the subset is the lowest numerical score assigned to an advertisement candidate. The method includes comparing the second threshold to a lowest numerical score assigned to an advertisement candidate, and removing the advertisement candidate having the lowest numerical score if the lowest numerical score falls below the second threshold. The method includes removing the advertisement candidate having the lowest numerical score if a sum of the numerical scores assigned to the advertisement candidates of the subset is below the second threshold. Removing from the subset the advertisement candidate having a lowest numerical score includes replacing the advertisement candidate having a lowest numerical score with a different advertisement candidate. Each numerical score includes a quality score calculated at least partially based on relevance of the respective advertisement candidate to online content for display in the online medium. Filtering the received advertisements includes selecting advertisement candidates having highest quality scores. The method includes calculating the second threshold based on a characteristic of search results for display in association with the advertisement candidates. The method includes calculating the second threshold based on a characteristic of a user of the online medium.

In general, another aspect of the subject matter described in this specification can be embodied in a method that includes receiving advertisement candidates for display in an online medium, the advertisement candidates each assigned a quality score calculated based at least in part on a measure indicative of relevance of the respective advertisement candidate to online content for display in the online medium, determining a subset of the advertisement candidates each having a quality score greater than a first threshold, calculating a second threshold by dividing a predetermined threshold value by a number of advertisement candidates in the subset, comparing the second threshold to a lowest quality score assigned to an advertisement candidate in the subset, and removing from the subset an advertisement candidate having the lowest quality score if the lowest quality score falls below the second threshold. Other embodiments of this aspect include corresponding system, apparatus, and computer program products.

These and other embodiments can each optionally include one or more of the following features. Removing from the subset the advertisement candidate having a lowest numerical score includes replacing the advertisement candidate having a lowest numerical score with a different advertisement candidate. Calculating the second threshold includes calculating the second threshold based on a characteristic of search results for display in association with the advertisement candidates. Calculating the second threshold comprises calculating the second threshold based on a characteristic of a user of the online medium.

Particular embodiments of the invention can be implemented to realize one or more of the following advantages. The quality of a collection of advertisements displayed to a user can be improved by calculating multiple quality thresholds. A quality threshold can be used that depends on a characteristic of the entire collection.

The details of one or more embodiments of the invention are set forth in the accompanying drawings and the descrip-

BRIEF DESCRIPTION OF THE DRAWINGS

Like reference numbers and designations in the various drawings indicate like elements.

DETAILED DESCRIPTION

An online advertising service displays advertisements to a user by selecting advertisements from a pool of advertisement candidates based on a quality score assigned to each advertisement candidate. A quality score is a metric that quantifies the relevance of an advertisement candidate to content that the user is viewing. Because a relevant advertisement is likely to be clicked on by a user, a higher quality score indicates a higher likelihood that the advertisement candidate will be clicked on if displayed as an advertisement on a web page (e.g., a web page displaying search results). The quality score may be based on other factors, such as the relevance and quality of a web page that the advertisement candidate links to.

When selecting online advertisements for display, the online advertising service could reject advertisement candidates that have quality scores that fall below a certain threshold because those advertisement candidates are not sufficiently relevant to content to be displayed with the search results or are low quality and not likely to be clicked on by a user (e.g., by selecting only advertisements having quality scores above the threshold). If the advertisement candidates are chosen independently of each other, sometimes most or all of the chosen advertisement candidates will have a quality score only slightly above the threshold. In implementations described herein, the advertisement candidates are also evaluated with respect to the other advertisement candidates, such that the user can be presented with advertisements that together satisfy a predetermined measure of advertisement quality.

Figure 1:
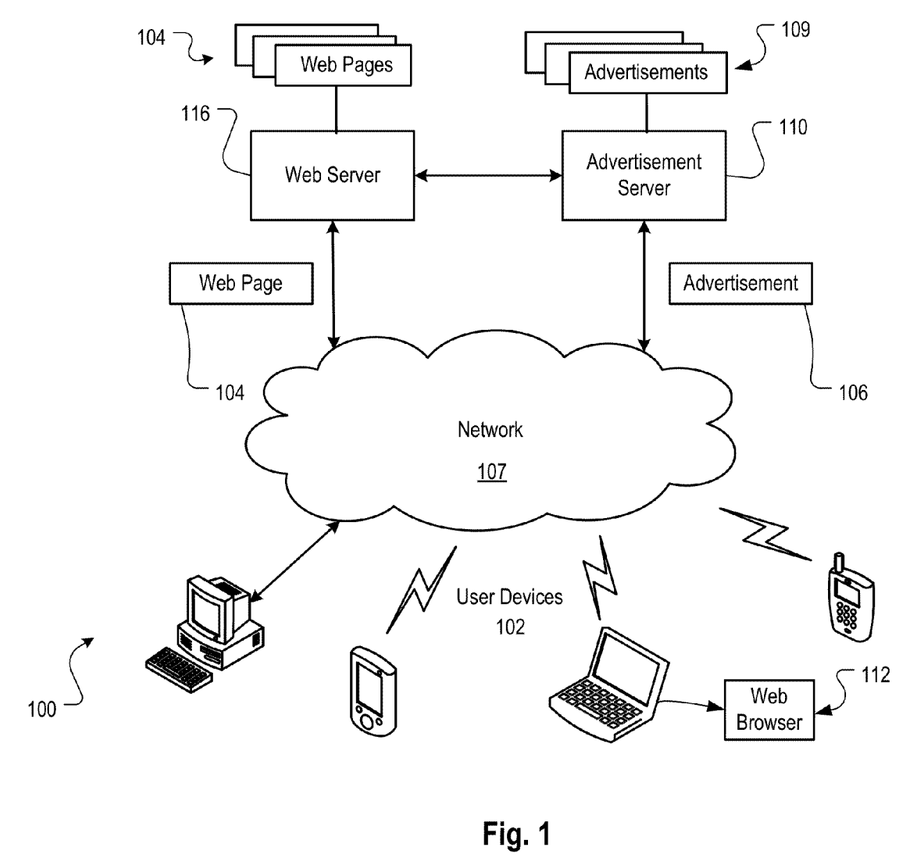
FIG. 1 is a block diagram of an exemplary online environment.

FIG. 1 is a block diagram of an exemplary online environment 100. The online environment 100 facilitates the serving of content items for display on user devices 102. For example, content items can include web pages 104 and advertisements 106 (e.g., advertisements related to the web pages 104).

Web pages 104 and advertisements 106 can be provided to user devices 102 through the network 107. The network 107 can be a wide area network, local area network, the Internet, or any other public or private network, or combination of both. User devices 102 can connect to the web server 116 (or the advertisement server 110) through the network 107 using any device capable of communicating in a computer network environment and displaying retrieved information. Exemplary user devices 102 include a web-enabled handheld device, a mobile telephone or smartphone, tablet device, a set top box, a game console, a personal digital assistant, a navigation device, or a computer.

For example, web pages 104 can be provided by a web server 116 for display on a user device 102, and advertisements 106 can be provided by an advertisement server 110 for display on the user device 102. In some implementations, the advertisements 106 are provided directly to the web server 116 by the advertisement server 110, and the web server 116 then provides the advertisements 106 to the user devices 102 in association with one or more particular web pages 104, e.g. web pages which are related to the advertisements 106. In some implementations, the web server 116 queries the advertisement server 110 for advertisements 106 related to one or more particular web pages 104, and the advertisement server 110 evaluates a pool 109 of advertisements and chooses one or more advertisements 106 that are related to the web pages 104, e.g. advertisements that pertain to subject matter referenced by or described within the web pages 104. The advertisements 106 can be displayed with the web page 104 on a web browser 112 of a user device 102. The advertisements 106 can also be requested as part of the delivery of a web page 104 in response to a user device 102 requesting the web page 104 from a web server 116.

Figure 2:
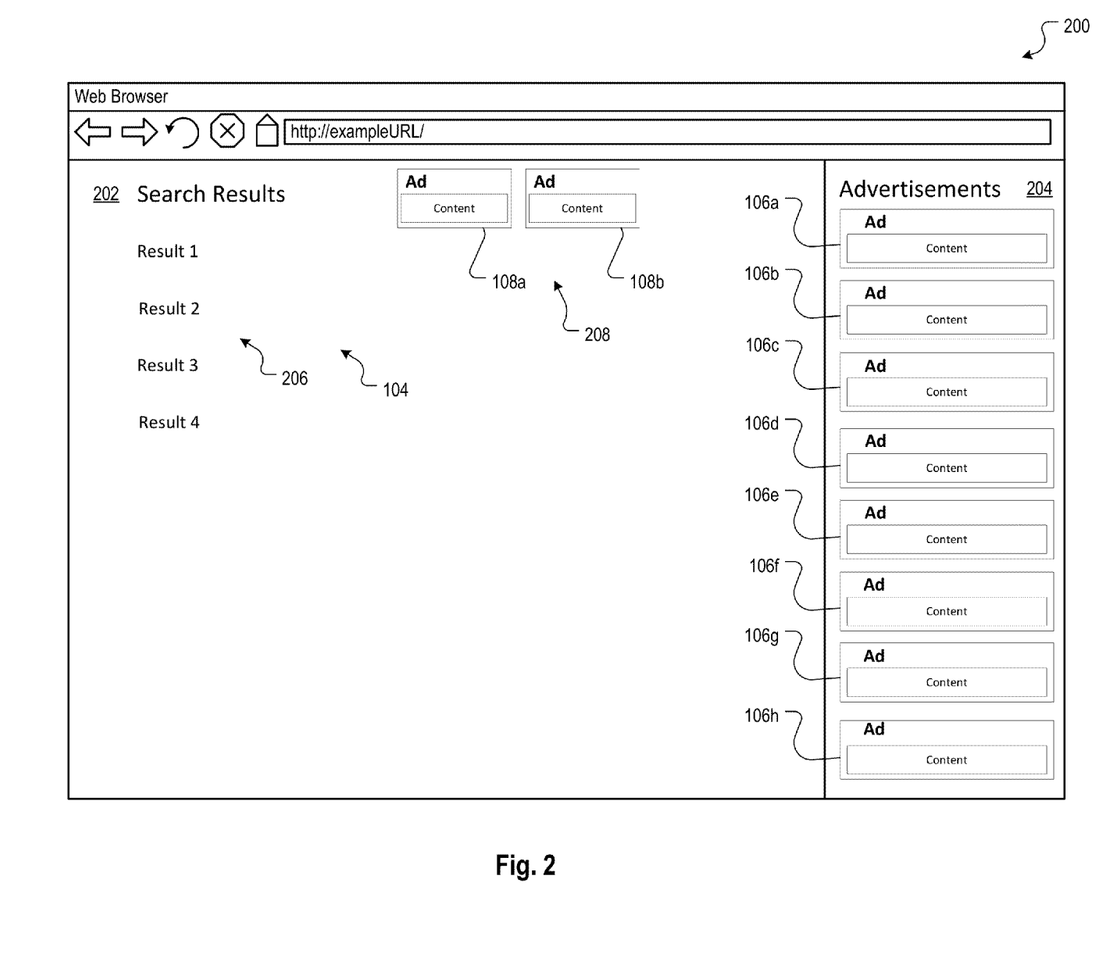
FIG. 2 is an example of a web browser displaying online content, including advertisements.

FIG. 2 is an example of a web browser 200 displaying online content, including advertisements. The web browser 200 includes a browsing portion 202 for displaying requested content (e.g., a web page 104 or search results presented in response to a user-entered query) and an advertisement portion 204, e.g., for displaying advertisements 106a-h related to the web page or search request. In the example shown, the web page 104 is a presentation of search results 206 representing references (e.g., hyperlinks to uniform resource locators) to other web pages selected by a search engine (not shown) to be related to a user query previously entered by a user of the web browser 200. The advertisements 106a-h have been identified (e.g., by an advertisement server 110 as shown in FIG. 1) in response to the particular content displayed within the web page 104. For example, the advertisements 106a-h can be associated with keywords that also appear in the search results 206, or the advertisements 106a-h can contain links to the web page (e.g., hyperlinks to a uniform resource locator of the web page). Advertisements that are relevant to the content of a web page may be more likely to be of interest to a user viewing the web page, and more likely to be followed up upon by the user (e.g., leading to the user clicking on the advertisement, submitting a product inquiry, or engaging in a commercial transaction solicited by an advertisement).

In some implementations, advertisements can appear in multiple locations within the web browser 200. For example, in addition to advertisements 106a-h displayed along an advertisement portion 204 on the right-hand side of the web browser 200, other advertisements 108a-b can be displayed in another advertisement portion 208 in an upper area of the web browser 200. In some examples, advertisements are displayed in a lower area of the web browser 200 or on the left-hand side of the web browser 200.

Advertisements 106a-h displayed in the web browser 200 can be chosen, e.g., by an advertisement server 110 (FIG. 1), based on a quality score associated with the advertisements. For example, an advertisement server can identify many possible candidates to display in the web browser 200 based on the degree to which the advertisement candidates are related to the content displayed in the web browser, e.g., the search results 206. The advertisement server can then select one or more advertisements from the advertisement candidates for display.

Figure 3:
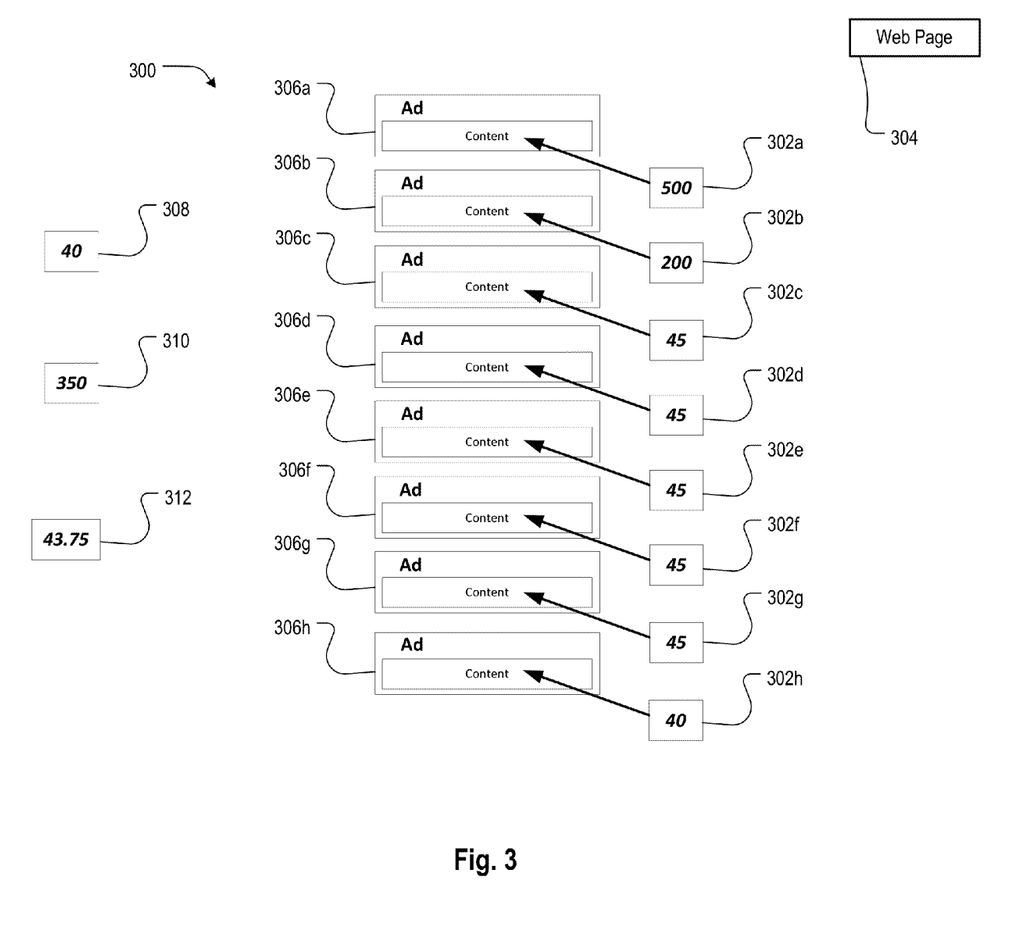
FIG. 3 is a diagram illustrating an example of a collection of advertisement candidates.

FIG. 3 is a diagram illustrating an example of a collection 300 of advertisement candidates 306a-h. The collection 300 of advertisement candidates 306a-h represents possible advertisements to be displayed with a web page 304. Each advertisement candidate 306a-h is assigned a quality score 302a-h represented as a numerical value and the advertisement candidates 306a-h are ordered by their respective quality scores. For example, an advertisement server 110 (FIG. 1) may cross-reference each advertisement candidate 306a-h with the contents of a web page 304 (e.g., search results) to determine the quality score. The quality score may be provided by a dedicated system for providing quality scores, for example, a quality score server system (not shown). For example, one advertisement candidate 306a has a quality score 302a of 500, which indicates that the advertisement candidate 306a is a better match to the content of the associated web page 304 than another advertisement candidate 306h that has a quality score 302h of 40. The quality scores 302a-h may also be calculated according to other factors such as the content of the advertisement or statistics about the way in which users react to the advertisement.

The advertisement candidates 306a-h may represent all advertisements that have been determined to be relevant to the web page 304, or the advertisement candidates 306a-h may represent a subset of advertisements that have been determined to be relevant to the web page 304. For example, the advertisement candidates 306a-h may be chosen randomly from a larger pool of advertisement candidates, or the advertisement candidates 306a-h may be chosen based on factors other than relevance to the web page 304. In some implementations, the number of advertisement candidates represents a maximum number of advertisements that can be displayed with a web page. For example, there may be eight advertisement candidates, and the web page can only accommodate eight advertisements or less.

In some implementations, the advertisement candidates 306a-h are chosen based on a score threshold 308. For example, the score threshold 308 can represent a minimum score that each quality score 302a-h should meet or exceed to be included in the collection 300 of advertisement candidates 306a-h, and only advertisement candidates having a quality score 302a-h above the score threshold 308 are included in the collection 300 of advertisement candidates 306a-h.

In some examples, the collection 300 may include one or more advertisement candidates 306a-h that meet or exceed the score threshold 308 by only a small amount. For example, advertisement candidates 306c-h all have a quality score 302c-h of 40 or 45. Although these quality scores satisfy the condition of meeting or exceeding the score threshold 308 of 40, the associated advertisement candidates 306c-h may only be marginally relevant to the web page. The other advertisement candidates 306a-b have quality scores 302a-b of 500 and 200 and may be highly relevant to the web page 304 compared to the remaining advertisement candidates 306c-h with lower quality scores 302c-h. If the collection 300 of advertisement candidates 306a-h were displayed with the web page 304, a user may view the collection of advertisements as a whole as having only marginal relevance overall.

Other thresholds can be used in addition to the score threshold 308. For example, a collection threshold 310 can be used to determine if the entire collection 300 meets a certain condition of quality. As such, two different thresholds are applied to select the advertisements, a first threshold based on the advertisement itself, and a second threshold that is based on multiple advertisements that are potentially going to be displayed. In some implementations, the collection threshold 310 is a predetermined value (e.g., a value chosen in advance on a single user interface) that can be used to compute a lowest minimum score 312 based on the number of advertisement candidates 306a-h in the collection 300. The lowest minimum score 312 is a numerical value that should be exceeded by the score of the lowest-scoring advertisement in the collection. For example, the collection threshold 310 can have a numerical value of [350] (indicated here in brackets to distinguish this numerical value from a reference numeral). The collection threshold 310 can be divided by the number of advertisements in the collection 300 to compute the lowest minimum score 312 (equation 1).

$$L > X/N \qquad \text{Equation 1}$$

(L: lowest minimum score; X: collection threshold; N: number of advertisement candidates)

When there are few advertisement candidates, this calculation yields a greater value for lowest minimum score 312 than the calculation would yield for a greater number of advertisement candidates. As such, the use of the collection threshold 310 imposes a higher threshold for quality scores for each advertisement candidate among a smaller collection of advertisement candidates, in comparison to the use of the collection threshold 310 with a larger collection of advertisement candidates.

In the example shown in FIG. 3, the numerical value of the lowest minimum score 312 is [350] divided by [8], or [43.75]. The advertisement candidate 306h having the lowest quality score has a quality score 302h of 40, which is below the lowest minimum score 312, indicating that the advertisement candidate 306h should be removed from the collection. Alternatively, the number of advertisement candidates were greater, then the lowest minimum score would be higher.

Figure 4A:
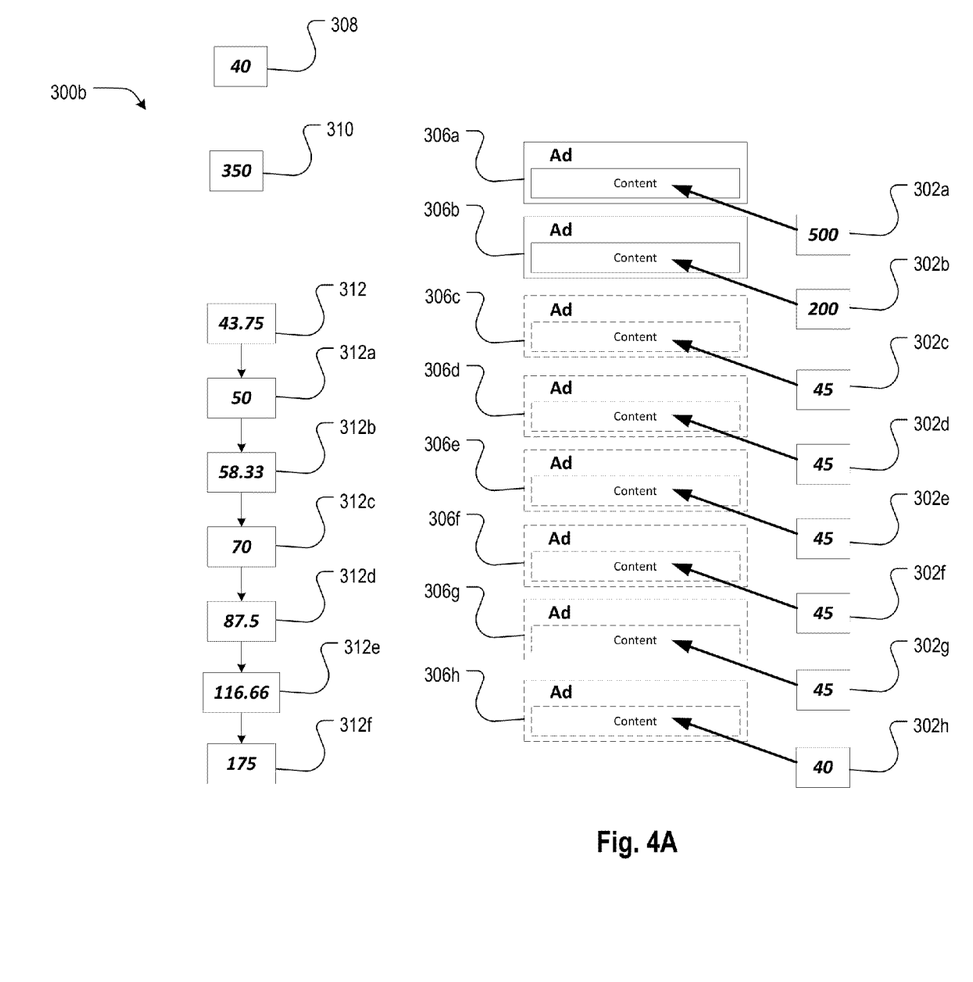
FIG. 4A is a diagram illustrating an example of the collection of advertisement candidates, showing advertisements being removed from the collection.

FIG. 4A is a diagram illustrating an example of a change in the collection of advertisement candidates, showing advertisements being removed from the collection. In some implementations, the advertisement candidate 306h having the lowest quality score 302h (in this example, a score of [40]) can be removed without adding a corresponding replacement advertisement candidate. The lowest minimum score 312 is calculated using equation 1. In this example, the lowest minimum score 312 is recalculated each time an advertisement candidate is removed. Initially, the lowest minimum score 312 is [43.75] (the result of dividing the collection threshold by the number of advertisement candidates, which is a calculation of [350]/[8]). When the advertisement candidate 306h having the lowest quality score 302h is removed, the lowest minimum score 312a is recalculated based on the smaller number of advertisement candidates 306a-g in the collection 300a. The first recalculation of the lowest minimum score 312a yields a value of [50] (the result of [350]/[7]). Upon a first recalculation of the lowest minimum score 312a, the advertisement candidate 306g having the new lowest quality score 302g (in this example, [45]) does not exceed the new lowest minimum score 312a ([50]) and the collection 300b still does not satisfy the collection threshold 310. Advertisement candidates 306c-g can be successively removed, and the lowest minimum score 312b-f recalculated upon each removal, until a lowest minimum score 312f is reached that is exceeded by the lowest quality score 302b of an advertisement candidate 306b. In this example, the lowest minimum score 312b-f is successively recalculated to be [58.33], [70], [87.5], [116.66], and [175]. When the lowest minimum score 312f is recalculated to be [175] ([350]/[2]), the advertisement candidate 306*b* having the lowest quality score 302*b* has a quality score of 200, and so the collection threshold 310 is satisfied.

The collection threshold 310 can be used in other ways. For example, the collection threshold 310 can be used as a minimum threshold to be exceeded by the sum of the quality scores among the collection of advertisement candidates. Referring to the example shown in FIG. 3, the sum of the quality scores 302*a-h* in the collection 300 is [965], which exceeds the numerical value of the collection threshold 310, which is [350]. If the collection 300 does not satisfy the collection threshold 310, the advertisement candidate 306*h* having the lowest quality score 302*h* can be removed (and in some examples replaced with another advertisement candidate having a different score). In some implementations where the collection threshold 310 is minimum threshold to be exceeded by the sum of the quality scores among the collection of advertisement candidates, the collection threshold 310 is variable and determined based on the number of advertisement candidates. The collection threshold 310 may increase for a greater number of advertisement candidates and decrease for a smaller number of advertisement candidates. For example, the collection threshold 310 could be determined by a look-up table containing values each for use with a different number of advertisement candidates.

Figure 4B:
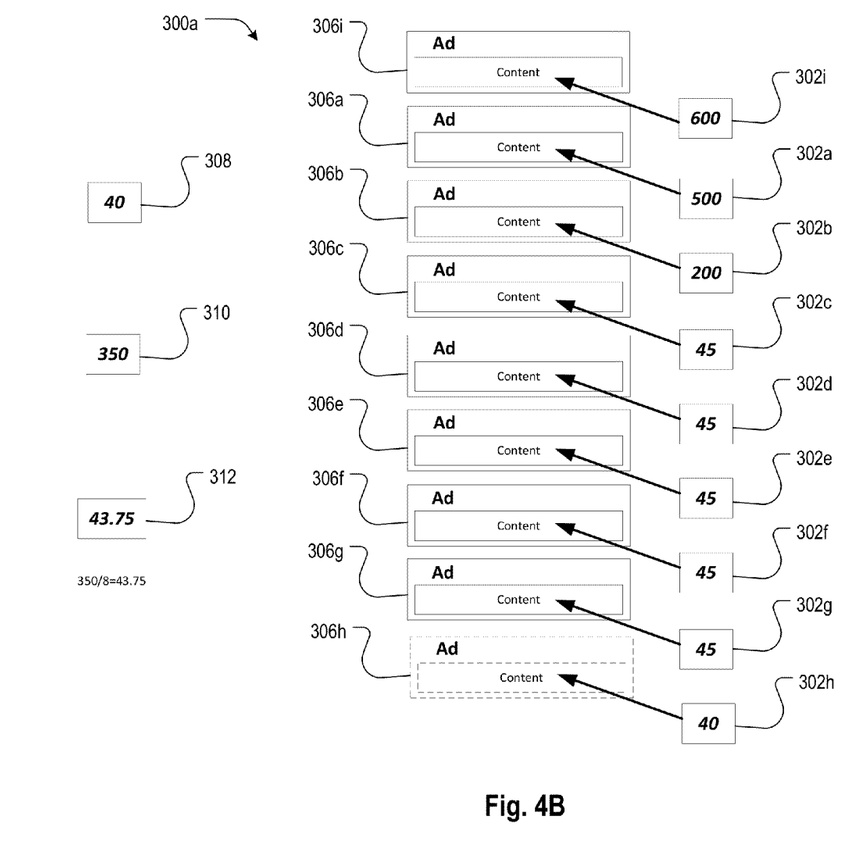
FIG. 4B is a diagram illustrating an example the collection of advertisement candidates, showing advertisements being replaced in the collection.

FIG. 4B is a diagram illustrating an example of another change in the collection of advertisement candidates, showing advertisements being replaced in the collection. In some implementations, advertisements are randomly selected from a group of candidates satisfying the threshold. In such examples, when the advertisement candidate 306*h* having the lowest quality score 302*h* (in this example, [40]) is removed, it can be replaced by another advertisement candidate 306*i*. For example, the advertisement candidates 306*a-h* may have been selected from a larger pool of possible advertisement candidates and so other advertisement candidates remain available for consideration. Because the number of advertisement candidates 306*b-i* in the collection remains the same when an advertisement candidate is replaced, the lowest minimum score 312 retains the same numerical value and does not change. The advertisement candidate 306*g* having the new lowest quality score 302*g* can then be compared to the lowest minimum score 312 to determine if the new collection 300*a* satisfies the collection threshold 310. In this example, the lowest quality score 302*g* has a numerical value of [45], and the lowest minimum score 312 is still [43.75], so the new collection 300*a* satisfies the collection threshold 310.

The collection threshold 310 can also be used in other kinds of calculations to determine whether to remove or replace advertisement candidates. For example, the calculation threshold can be adjusted (for example, raised or lowered) depending on the presence of absence of certain conditions. In some implementations, the location of the advertisements can be used to adjust the calculation threshold 310. For example, referring to FIG. 2, advertisements 108*a*, 108*b* displayed in the upper portion 208 of the web browser 200 can be evaluated using a different calculation threshold than the advertisements 106*a-h* displayed on the right-hand portion 204 of the web browser 200. In some implementations, the search results 206 can be used to adjust the calculation threshold 310. For example, the number of search results can be used to adjust the calculation threshold 310, or the subset of search results currently viewed by the user (e.g., a page of search results) can be used to adjust the calculation threshold 310. For example, in the case of a small number of search results displayed to a user, the number of advertisements displayed to the user may also be small, and so the calculation threshold 310 can be adjusted to be higher so that the small number of advertisements shown to the user are of high quality. In some implementations, a characteristic of the user can be used to adjust the calculation threshold 310. A characteristic of the user may be the user's language, the user's location (e.g., country of origin), a preference indicated by the user (e.g., a setting made by the user in a user profile), or another characteristic.

Figure 5:
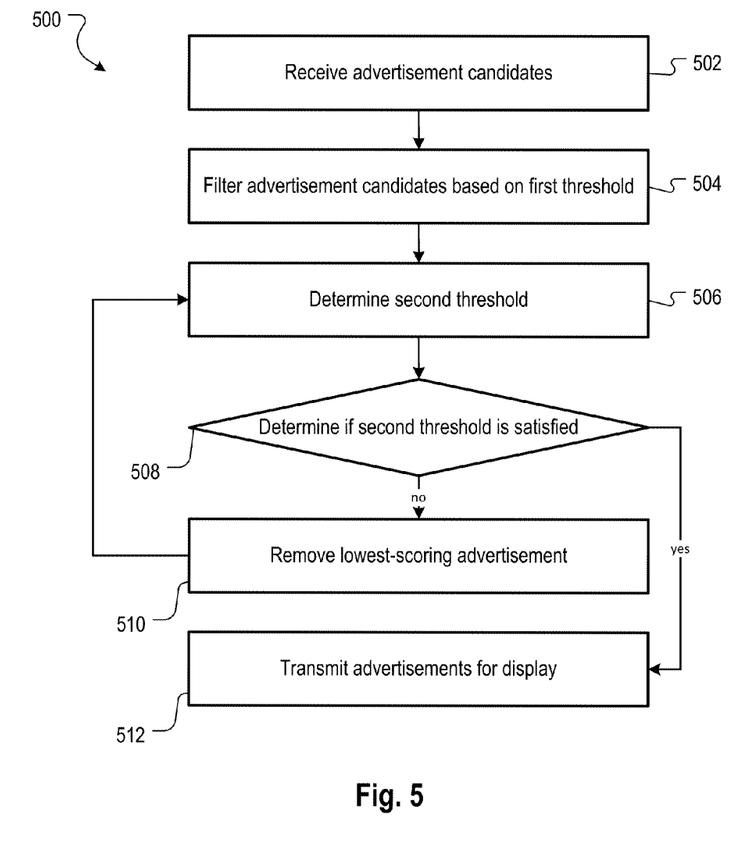
FIG. 5 is a flowchart of an exemplary process for selecting advertisements for display.

FIG. 5 is a flowchart of an exemplary process 500 for selecting advertisements for display. The process 500 can be used, for example, by the advertisement server of FIG. 1 to determine which advertisements 106 should be displayed with a web page 104.

At stage 502, an advertisement server receives advertisement candidates for display with a web page. For example, the advertisement candidates can be received from a process or mechanism that assigns quality scores to advertisement candidates, for example, based on the degree to which an advertisement candidate is relevant to the web page and the likelihood that a user will click on the advertisement candidate if presented as an advertisement.

At stage 504, the advertisement server filters the advertisement candidates based on a first threshold. For example, the advertisement server may remove all advertisement candidates that have a quality score below a numerical value represented by the first threshold. As such, the advertisement server retains the advertisement candidates that have a quality score above the numerical value represented by the first threshold.

At stage 506, the advertisement server determines the second threshold. The threshold can be based on relationships among the quality scores associated with the advertisement candidates. For example, the second threshold can be calculated by dividing a predetermined threshold value by the number of filtered advertisement candidates. Alternatively, the value can be determined by accessing a lookup table.

At stage 508, the advertisement server determines if the second threshold is satisfied by evaluating a characteristic of the set of filtered advertisement candidates. For example, the advertisement server may examine the quality score of the lowest-scoring advertisement to determine if it satisfies the second threshold. Because the second threshold can depend on characteristics of multiple advertisement candidates, such as the number of advertisement candidates and the quality scores of the advertisement candidates, the lowest-scoring advertisement is therefore evaluated based at least partially upon those characteristics of the other advertisement candidates.

If the second threshold is satisfied, at stage 512, the advertisements are transmitted for display, for example, on a web browser as part of a web page. If the second threshold is not satisfied, at stage 510, the lowest-scoring advertisement candidate is removed from the filtered advertisement candidates. The process then returns to stage 506 and the second threshold is recalculated based on the changed number of advertisement candidates. The process continues until the second threshold is satisfied.

Figure 6:
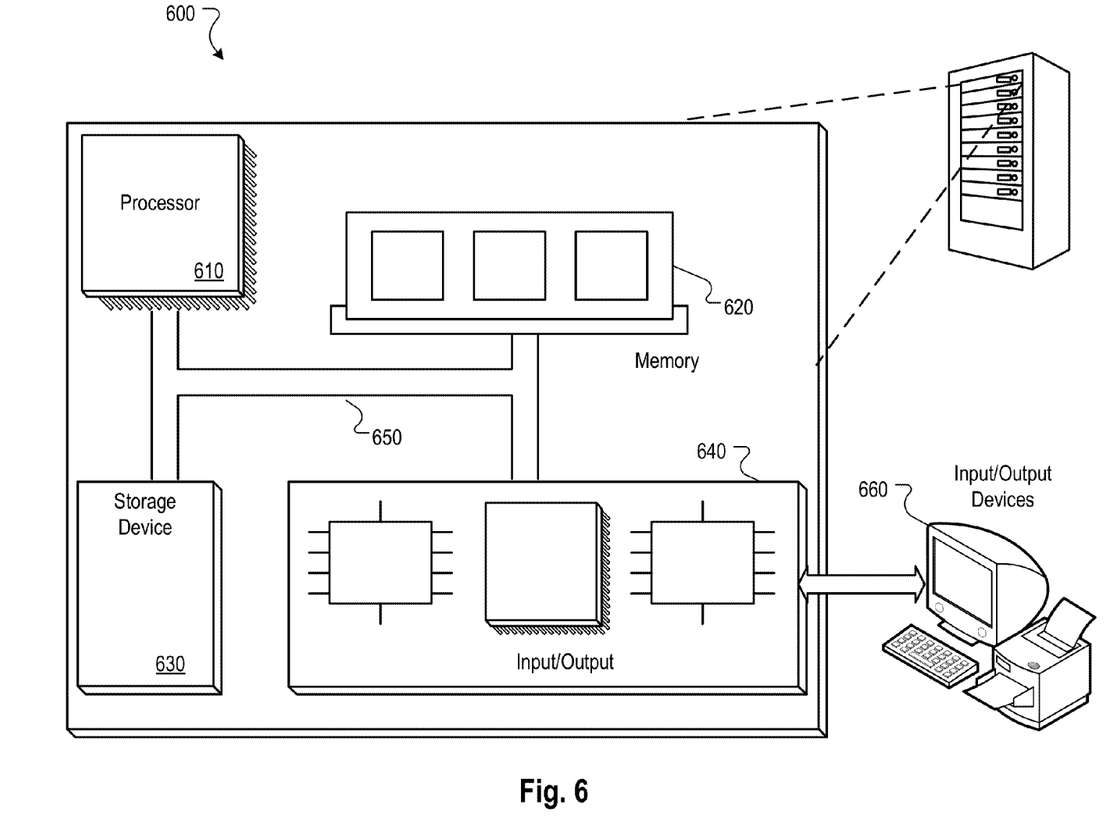
FIG. 6 is block diagram of an exemplary computer system that can be used to facilitate the display of advertisements.

FIG. 6 is block diagram of an exemplary computer system 600 that can be used to facilitate display of advertisements. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The web server, advertisement server, and content aggregator can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and advertisement server can be distributively implemented over a network, such as a server farm, or can be implemented in a single computer device.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method performed by a data processing apparatus having a memory coupled to the data processing apparatus, the memory including instructions stored therein which, when executed by the data processing apparatus, cause the data processing apparatus to perform the method, comprising:
   receiving by the data processing apparatus a collection of advertisement candidates, along with their respective quality scores calculated based at least in part on a measure of relevance of respective advertisement candidates to online content;
   determining by the data processing apparatus a score threshold based at least in part on relationships among at least a portion of the quality scores associated with the advertisement candidates in the collection of advertisement candidates; and
   based on the determined score threshold, identifying by the data processing apparatus a subset of advertisement candidates of the collection for display in an online medium.

2. The method of claim 1, wherein said identifying the subset of advertisement candidates of the collection for display comprises identifying one advertisement candidate of the collection to exclude from the subset, based on a relationship between a quality score of the one advertisement candidate and quality scores of other advertisement candidates of the collection.

3. The method of claim 1, wherein said determining the score threshold comprises calculating the score threshold by dividing a predetermined threshold value by a number of advertisement candidates in the subset.

4. The method of claim 1, wherein said determining the score threshold comprises calculating the score threshold based on a characteristic of search results for display in association with the advertisement candidates.

5. The method of claim 1, wherein said determining the score threshold comprises calculating the score threshold based on a characteristic of a user of the online medium.

6. A system, comprising:
   a data processing apparatus; and
   a memory coupled to the data processing apparatus having instructions stored thereon which, when executed by the data processing apparatus cause the data processing apparatus to perform operations comprising:
   receiving a collection of advertisement candidates, along with their respective quality scores calculated based at least in part on a measure of relevance of respective advertisement candidates to online content;
   determining a score threshold based at least in part on relationships among at least a portion of the quality scores associated with the advertisement candidates in the collection of advertisement candidates; and
   based on the determined score threshold, identifying a subset of advertisement candidates of the collection for display in an online medium.

7. The system of claim 6, wherein the operation of identifying the subset of advertisement candidates of the collection for display comprises identifying one advertisement candidate of the collection to exclude from the subset, based on a relationship between a quality score of the one advertisement candidate and quality scores of other advertisement candidates of the collection.

8. The system of claim 6, wherein the operation of determining the score threshold comprises calculating the score threshold by dividing a predetermined threshold value by a number of advertisement candidates in the subset.

9. The system of claim 6, wherein the operation of determining the score threshold comprises calculating the score threshold based on a characteristic of search results for display in association with the advertisement candidates.

10. The system of claim 6, wherein the operation of determining the score threshold comprises calculating the score threshold based on a characteristic of a user of the online medium.

11. A non-transitory computer readable medium storing software comprising instructions executable by a processing device and upon such execution causing the processing device to perform operations comprising:
   receiving a collection of advertisement candidates, along with their respective quality scores calculated based at least in part on a measure of relevance of respective advertisement candidates to online content;
   determining a score threshold based at least in part on relationships among at least a portion of the quality scores associated with the advertisement candidates in the collection of advertisement candidates; and
   based on the determined score threshold, identifying a subset of advertisement candidates of the collection for display in an online medium.

12. The non-transitory computer readable media of claim 11, wherein the operation of identifying the subset of advertisement candidates of the collection for display comprises identifying one advertisement candidate of the collection to exclude from the subset, based on a relationship between a quality score of the one advertisement candidate and quality scores of other advertisement candidates of the collection.

13. The non-transitory computer readable media of claim 11, wherein the operation of determining the score threshold comprises calculating the score threshold by dividing a predetermined threshold value by a number of advertisement candidates in the subset.

14. The non-transitory computer readable media of claim 11, wherein the operation of determining the score threshold comprises calculating the score threshold based on a characteristic of search results for display in association with the advertisement candidates.

15. The non-transitory computer readable media of claim 11, wherein the operation of determining the score threshold comprises calculating the score threshold based on a characteristic of a user of the online medium.

* * * * *